United States Patent [19]

Knappe

[11] Patent Number: 5,425,877
[45] Date of Patent: Jun. 20, 1995

[54] MEMBRANE ELEMENT FOR REVERSE OSMOSIS

[76] Inventor: Holger Knappe, Ringstrasse, Grabau, Germany, D-23845

[21] Appl. No.: 132,367

[22] Filed: Oct. 5, 1993

[30] Foreign Application Priority Data

Oct. 9, 1992 [DE] Germany .................. 42 33 952.9

[51] Int. Cl.6 ............................................. B01D 27/06
[52] U.S. Cl. .......................... 210/493.4; 210/500.26; 210/503; 210/505; 210/456; 264/22; 156/275.5; 430/4
[58] Field of Search ............... 210/490, 500.26, 503, 210/493.4, 457, 497.1, 500.21, 456, 505; 430/4; 264/22; 156/273.3, 275.5; 424/22

[56] References Cited

U.S. PATENT DOCUMENTS

| | | | |
|---|---|---|---|
| 3,224,592 | 12/1965 | Burns et al. | 210/493.4 |
| 3,652,356 | 3/1972 | Van Gasse et al. | 156/275.5 |
| 4,033,878 | 7/1977 | Foreman et al. | 210/321.74 |
| 4,240,908 | 12/1980 | Swain et al. | 210/497.1 |
| 4,388,137 | 6/1983 | McCarthy et al. | 156/275.5 |
| 4,839,123 | 6/1989 | Duncan | 264/22 |

Primary Examiner—Robert A. Dawson
Assistant Examiner—Ana M. Fortuna
Attorney, Agent, or Firm—Darby & Darby

[57] ABSTRACT

The invention relates to membrane elements for reverse osmosis, comprising a permeate pipe with a membrane wound around it, around which glass fibers are wound radially and fixed by reaction resins, and is characterized in that the reaction resins are cross linked by photopolymerization.

8 Claims, 1 Drawing Sheet

U.S. Patent June 20, 1995 5,425,877
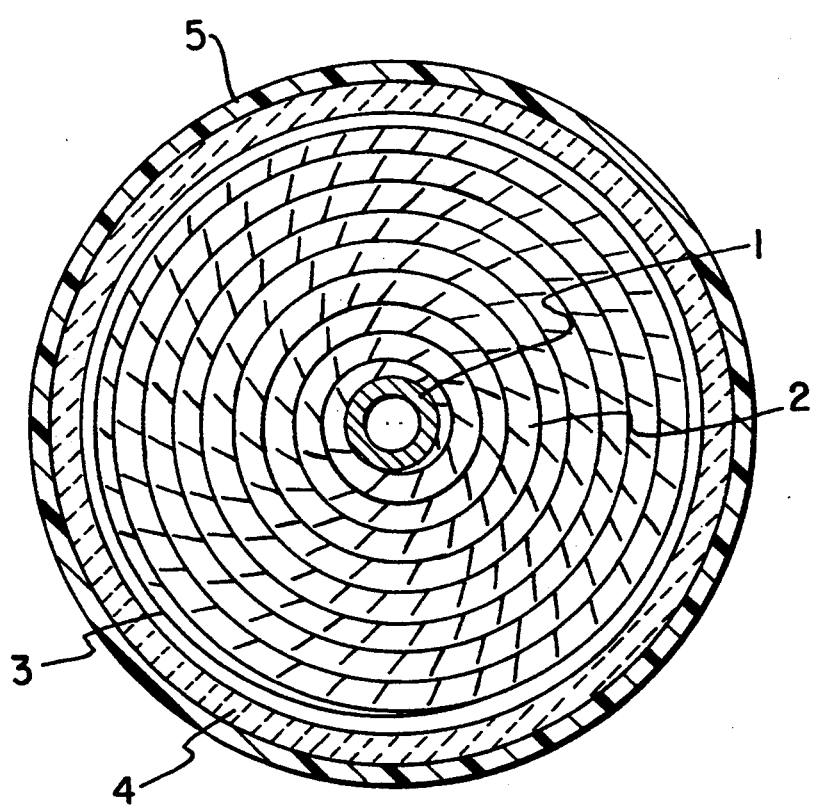

MEMBRANE ELEMENT FOR REVERSE OSMOSIS

BACKGROUND OF THE INVENTION

Reverse osmosis refers to the fact that solvent migrates from a concentrated aqueous or nonaqueous solution of, usually, electrolytes into the dilute solution, when the former is placed under a pressure, which is greater than its osmotic pressure. Reverse osmosis is used on a large scale for obtaining drinking water by desalinating sea water and by working up brackish water. Depending on the intended area of use, the necessary membranes are used as flat, tubular or hose membranes, which are usually combined into so-called modules. The membranes themselves consist preferably of polyamides, polysulfones or cellulose acetates.

For the spiral membranes, which are customary at the present time, the membrane sheet is wound around the permeate pipe and is then fixed by means of glass fibers, which are subsequently wound around it radially and which are coated with a reactive resin. This membrane element is then inserted in a pressure-resistant housing or pipe, which must be designed, so that it can withstand the operating pressures of about 16 to 100 bar customarily encountered during reverse osmosis, which is referred to as RO in the following. The length of the pressure pipes for the tubular membranes varies depending on the area of application and for seawater desalination plants, for example, usually is between 1 and 6 meters, while the length of the tubular membranes is about 1 m and the diameter about 20 cm.

The tubular membranes are produced at the present time practically everywhere in the following manner. The rolled-up membrane sheet is provided with radial, glass fiber winding, which is then coated with a reactive resin or the glass fiber, as it is being wound, is pulled through a bath of reactive resin, so that the application of fiber and reactive resin take place simultaneously.

The reactive or reaction resins are polyfunctional, that is, unsaturated products, which are produced by polycondensation and can be processed with unsaturated monomers to thermosetting end products. The reaction resins include, in particular, the unsaturated polyester resins, which are referred to in abbreviated fashion as UP, the polydiallyl phthalate resins, referred to as PDAP, and certain silicone resin molding compositions. Polyadducts, which include the epoxide resins and the polyisocyanate or polyurethane resins, are, however, also reactive resins.

UP resins consist of high molecular weight esters of dicarboxylic acids, such as maleic acid, and polyhydric alcohols, such as propylene glycol or butylene glycol. The chain molecules, formed from the acids and the diols, contain one double bond per acid group. This double bond provides the possibility for a later cross linking reaction. The relatively high molecular weight, linear molecules are usually dissolved in monomers, such as styrene. These mixtures polymerize only when a catalyst, usually a peroxide, is added. The resin then changes over from the unsaturated to the saturated, spatially cross linked state. The cross linking polymerization usually requires temperatures between about 80° and 100° C., which can be lowered by the addition of an activator, such as cobalt or manganese salts or tertiary amines. The curing time depends partly on the amount of accelerator and particularly on the thickness of the layer and can vary from minutes to a few hours.

Until now, tubular membranes were produced by the classical method in that the applied reactive resin layer applied, which usually consists of epoxide resins, is cross linked thermally. In order to prevent the applied resin layer flowing away, the tubular membranes must be rotated periodically with special equipment during the curing, which may take several hours. Furthermore, the furnaces for curing tubular membranes one to several meters long must have appreciable dimensions. It must also be taken into consideration that, due to the heating required, these methods naturally are very energy intensive and therefore very cost intensive. Thermal curing usually takes place during 24 hours at 130° C.

Methods for curing reaction resins, particularly polyesters, at room temperature are also known. These methods, however, have the disadvantage that the resin, which is solidified at room temperature, is polymerized incompletely so that, at the end of the curing, the molded objects must be post-cured for several hours in hot-air rooms. Higher temperatures are usually recommended for post curing, which would otherwise require 2 to 3 weeks at room temperature.

A further method for polymerizing reaction resins is the well-known photopolymerization method, for which free radical or ionic mechanisms are initiated by light. For the polymerization initiated by free radicals, suitable monomers, such as unsaturated esters, are added to photoinitiators, which usually are peroxides. To increase the sensitivity, photo-sensitizers, such as acetophenone, benzophenone or dyes are added additionally. The disadvantage of photopolymerization lies, however, therein that the layer may only have a slight thickness, as it is otherwise not thoroughly cured. Industrially, this method is therefore used only for curing lacquers or for producing photoresists for the electronics industry.

For the hitherto customary tubular membranes, for which the membrane package is encased directly with glass fibers and reaction resin, there is the further disadvantage that the monomers used as solvent for the reaction resins, in the event that they are not completely tied in during the polymerization, can come into contact with the desalinated water. The same is true for residues of initiators. In this connection, particularly there are reservations particularly in the case of amines initiators since, under certain circumstances, amines can lead to the formation of nitroso compounds, which are almost always carcinogenic.

There is therefore a need for membrane elements, which can be produced more easily and clearly less expensively than previously and which provide a permeate, which is absolutely safe from a health point of view.

SUMMARY OF THE INVENTION

To accomplish this objective, membrane elements are proposed for RO, which comprise a permeate pipe with a membrane wound around it, around which glass fibers are wound radially and fixed by reaction resins, which are characterized in that the reaction resins are cross linked by photopolymerization.

It was a complete surprise that tubular membranes with a known structure could also be produced by cross linking reactive resins, particularly UP resins, which are applied on the glass fibers, by photopolymerization since, contrary to previous assumptions, it is entirely possible to maintain the thickness of the resin layer in a range, which is accessible to photopolymerization.

The use of photopolymerization tier curing offers appreciable advantages over methods previously customary, since the tubular membranes can be produced in a fraction of the time previously required and considerable amounts of energy can be saved because no heating is necessary. Furthermore, the method has the advantage that the cross linking reaction after the application takes place practically suddenly, so that the danger of monomers penetrating from the solvent into the membrane sheets can practically be eliminated. In addition, there is the further advantage that the photopolymerization can be carried out without amine initiators, so that corresponding food law reservations, resulting from the presence of amines, can be excluded.

The inventive tubular membranes are produced by radially winding glass fibers around the permeate pipe, around which the membrane has been wound. The glass fiber layer can be relatively thin, since the pressure load in the exchange systems of a desalination plant is absorbed by the housing surrounding the tubular membrane. The radial winding of glass fibers is provided with a layer of reaction resins, particularly UP resins, which is designed so that the final thickness of the layer after polymerization is about 0.5 to 1.5 mm. The tubular membranes, so prepared, are supplied immediately after the coating process continuously and with a slight rotation to UV light equipment with an output of about 120 to 200 watt/cm. As initiators, the UP resins exclusively contain compounds, which do not contain any nitrogen, and are, in particular, peroxides, such as benzoyl peroxide, substituted ketones or phosphine oxides. For the curing, preferably light with a wavelength ranging from 250 to 400 nm and especially from 340 to 350 nm is used.

Curing takes place within about 30 to 120 seconds, depending on the thickness of the layer.

Although it is possible to do without the addition of amine initiators for this method, it has proven to be particularly advantageous to provide the inventive membrane, which is wound around the permeate pipe, with a tubular film of thermoplastic materials, which are absolutely safe from a food law point of view (i.e., the tubular film is not toxic), before the glass fibers are wound around the membrane and before the reaction resin is applied. As thermoplastic materials, which are absolutely safe from a food law point of view, preferably polyethylene or polypropylene or their copolymers can be used. In this way, it is possible to preclude any effect of monomers from the solvents used or any migration of residues of the initiator.

The inventive membrane elements can be produced in a very much shorter time and far less expensively than membrane elements of previously customary production methods. Furthermore, they are distinguished by the excellent quality of the permeate.

BRIEF DESCRIPTION OF THE FIGURE

The invention is described in greater detail in the following by means of the Figure.

The drawing Figure is a cross-section of a membrane element according to the present invention.

DETAILED DESCRIPTION OF THE PRESENT INVENTION

The drawing shows a cross section through an inventive, tubular membrane. The membrane sheet (2) is wound around the permeate pipe (1) and enclosed by a tubular film (3) of thermoplastic materials, which are completely safe from a food law point of view. Adjoining this tubular hose is the radial winding with glass fibers (4), which is embedded in the outer casing of reaction resins (5).

The invention is explained further by means of an Example.

The tubular membranes in the form of spiral filter elements typically have a length of about 1 m (40 inches) and a diameter of about 20 cm (8 inches). These filter bodies are coated by a polyethylene shrink film with a diameter of about 202 mm. The film fits exactly between the anti-telescoping rings and covers the membrane part completely. The membrane element is now clamped into the fiber-laying equipment and heated with a hot air radiator until the polyethylene film has shrunk. This usually takes about 70 seconds.

Subsequently, an E glass roving strand with a width of about 3 cm is wound radially on the membrane element so as to cover its surface. At the same time, the roving passes through a bath with polyester resin and is wound in this impregnated form. The laminate surface, so formed, has a thickness of about 0.8 mm, the glass portion constituting about 75 to 80%.

The polyester resin is provided with a photoinitiator or preferably a mixture of amine-free photoinitiators. After a winding time of about 20 seconds, the chamfer (sic!) is severed and, at the same time, the light of the UV radiator, disposed over the winding machine, is set free. The wavelength of the UV light used is about 350 nm. The output of the UV light equipment is 200 W/m. After about 60 to 90 seconds, the laminate is cured completely all the way through, so that the ready-for-use membrane element can be taken from the machine.

I claim:

1. A membrane element for reverse osmosis, comprising a permeate pipe having a membrane wound around it, a plurality of glass fibers being wound radially around said membrane and being fixed by reaction resins, said reaction resins being cross linked by photopolymerization.

2. The membrane element of claim 1, wherein said reaction resins include unsaturated polyesters.

3. The membrane element of claim 2, further comprising a tubular film of thermoplastic material, which is non-toxic, being disposed between said membrane and fibers, such that said tubular film covers said membrane.

4. The membrane element of claim 1, further comprising a tubular film of thermoplastic material, which is non-toxic, is disposed such that said tubular film covers said membrane.

5. A method for producing membrane elements for reverse osmosis comprising the steps of:
    winding a membrane around a permeate pipe;
    winding a plurality of glass fibers around said membrane;
    fixing said plurality of glass fibers by reaction resins that are cross linked by photopolymerization, wherein said reactions resins, after addition of a plurality of initiators, are cured with UV light having wavelengths falling within the range of about 250 to 400 nm.

6. The method of claim 5, wherein the curing with light is carried out with light at wavelengths in the range of about 320 to 35 nm.

7. The method of claim 6, wherein the reaction resin is applied as a layer with a thickness of about 0.5 to 1.5 nm.

8. The method of claim 5, wherein the reaction resin is applied as a layer with a thickness of about 0.5 to 1.5 nm.

* * * * *